(12) United States Patent
Okubo

(10) Patent No.: US 9,251,447 B2
(45) Date of Patent: Feb. 2, 2016

(54) IMAGE FORMATION APPARATUS AND METHOD OF FORMING IMAGE

(71) Applicant: Oki Data Corporation, Tokyo (JP)

(72) Inventor: Tsuyoshi Okubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/468,390

(22) Filed: Aug. 26, 2014

(65) Prior Publication Data

US 2015/0062657 A1    Mar. 5, 2015

(30) Foreign Application Priority Data

Aug. 29, 2013   (JP) ................................ 2013-178205

(51) Int. Cl.

| | |
|---|---|
| *H04N 1/405* | (2006.01) |
| *G06K 15/02* | (2006.01) |
| *H04N 1/387* | (2006.01) |
| *H04N 1/40* | (2006.01) |
| *H04N 1/409* | (2006.01) |

(52) U.S. Cl.
CPC .......... *G06K 15/188* (2013.01); *G06K 15/1822* (2013.01); *H04N 1/387* (2013.01); *H04N 1/40012* (2013.01); *H04N 1/4092* (2013.01)

(58) Field of Classification Search
CPC ..... H04N 1/58; H04N 1/4074; H04N 1/4092; H04N 9/04; G06T 2207/10024; G06T 7/0083; G06T 7/0081; G06T 5/20; G06T 2207/20192; G06T 5/008; G06T 7/0085
USPC ........ 358/1.9, 2.1, 3.15, 3.26–3.27, 500, 504, 358/400, 406, 448, 532; 382/190, 162–167, 382/173, 199
See application file for complete search history.

(56) References Cited

U.S. PATENT DOCUMENTS

| | | | | |
|---|---|---|---|---|
| 5,173,769 | A  * | 12/1992 | Hashimoto .................... | 358/520 |
| 5,418,574 | A  * | 5/1995  | Miyabata et al. ............. | 348/625 |
| 5,742,410 | A  * | 4/1998  | Suzuki .......................... | 358/518 |
| 2007/0104363 | A1 * | 5/2007 | Yoshiura et al. ............... | 382/165 |
| 2010/0329550 | A1 * | 12/2010 | Cheatle ......................... | 382/165 |

FOREIGN PATENT DOCUMENTS

| | | |
|---|---|---|
| JP | H11-17961 A | 1/1999 |
| JP | 2000-050098 A | 2/2000 |
| JP | 2001-239705 A | 9/2001 |

* cited by examiner

*Primary Examiner* — Thomas D Lee
*Assistant Examiner* — Stephen M Brinich
(74) *Attorney, Agent, or Firm* — Marvin A. Motsenbocker; Mots Law, PLLC

(57) ABSTRACT

An image formation apparatus includes: a data generation unit configured to generate image data based on image formation data giving an instruction to print an image including image regions, the image data indicating pixel values of the image regions; and an image formation unit configured to form the image on a recording medium based on the image data generated by the data generation unit. The data generation unit generates the image data such that a boundary between one of the image regions and an image region adjacent to the one image region is highlighted, if the pixel value of the one image region and the pixel value of the adjacent image region are approximate to each other.

23 Claims, 9 Drawing Sheets

IMAGE FORMATION APPARATUS AND METHOD OF FORMING IMAGE

CROSS REFERENCE TO RELATED APPLICATIONS

This application claims priority based on 35 USC 119 from prior Japanese Patent Application No. 2013-178205 filed on Aug. 29, 2013, entitled "IMAGE FORMATION APPARATUS AND METHOD OF FORMING IMAGE", the entire contents of which are incorporated herein by reference.

BACKGROUND OF THE INVENTION

1. Field of the Invention

The disclosure relates to an image formation apparatus and a method of forming an image.

2. Description of Related Art

In some cases, a monochrome image is formed on a recording medium on the basis of print data including an image expressed in color. In such a case, a conventional image formation apparatus is configured such that patterns, each including lines at a certain inclination, width, and/or density, are set for individual colors. The apparatus performs a rendering by replacing colors in a color image with the corresponding patterns as disclosed in Patent Literature 1 (Japanese Laid-open Patent Publication No. 11-17961). This can maintain the visual distinction identification even in a case where the visual distinction among portions of different colors in the color image is lowered because the portions have similar colors when printed in a gray scale.

SUMMARY OF THE INVENTION

However, a method in which colors are replaced with patterns has the possibility that an output result may be significantly different from an output from print data, and has a problem in that some patterns make the output result hard to read. Moreover, even when a color image is formed on a recording medium on the basis of print data including the image expressed in color, adjacent image regions (objects) of similar colors in the image, if any, are difficult to distinguish from each other in some cases.

Hence, one embodiment of the invention aims to form an image such that adjacent image regions of similar colors, if any, can be easily distinguished from each other.

An aspect of the invention is an image formation apparatus that includes: a data generation unit configured to generate image data based on image formation data giving an instruction to print an image including image regions, with the image data indicating pixel values of the image regions; and an image formation unit configured to form the image on a recording medium based on the image data generated by the data generation unit. The data generation unit generates the image data such that a boundary between one of the image regions and an image region adjacent to the one image region is highlighted, if the pixel value of the one image region and the pixel value of the adjacent image region are approximate to each other.

Another aspect of the invention is a method of forming an image that includes: generating image data based on image formation data giving an instruction to print an image including image regions, with the image data indicating pixel values of the image regions; and forming an image on a recording medium based on the image data generated in the generating of the image data. In the step of generating of the image data, the image data is generated such that a boundary between one of the image regions and an image region adjacent to the one image region is highlighted, if the pixel value of the one image region and the pixel value of the adjacent image region are approximate to each other.

With these aspects of the invention, even when regions of similar colors are adjacent to each other in an image, the image can be formed so as to allow these regions to be easily distinguished.

DETAILED DESCRIPTION OF EMBODIMENTS

Figure 1:
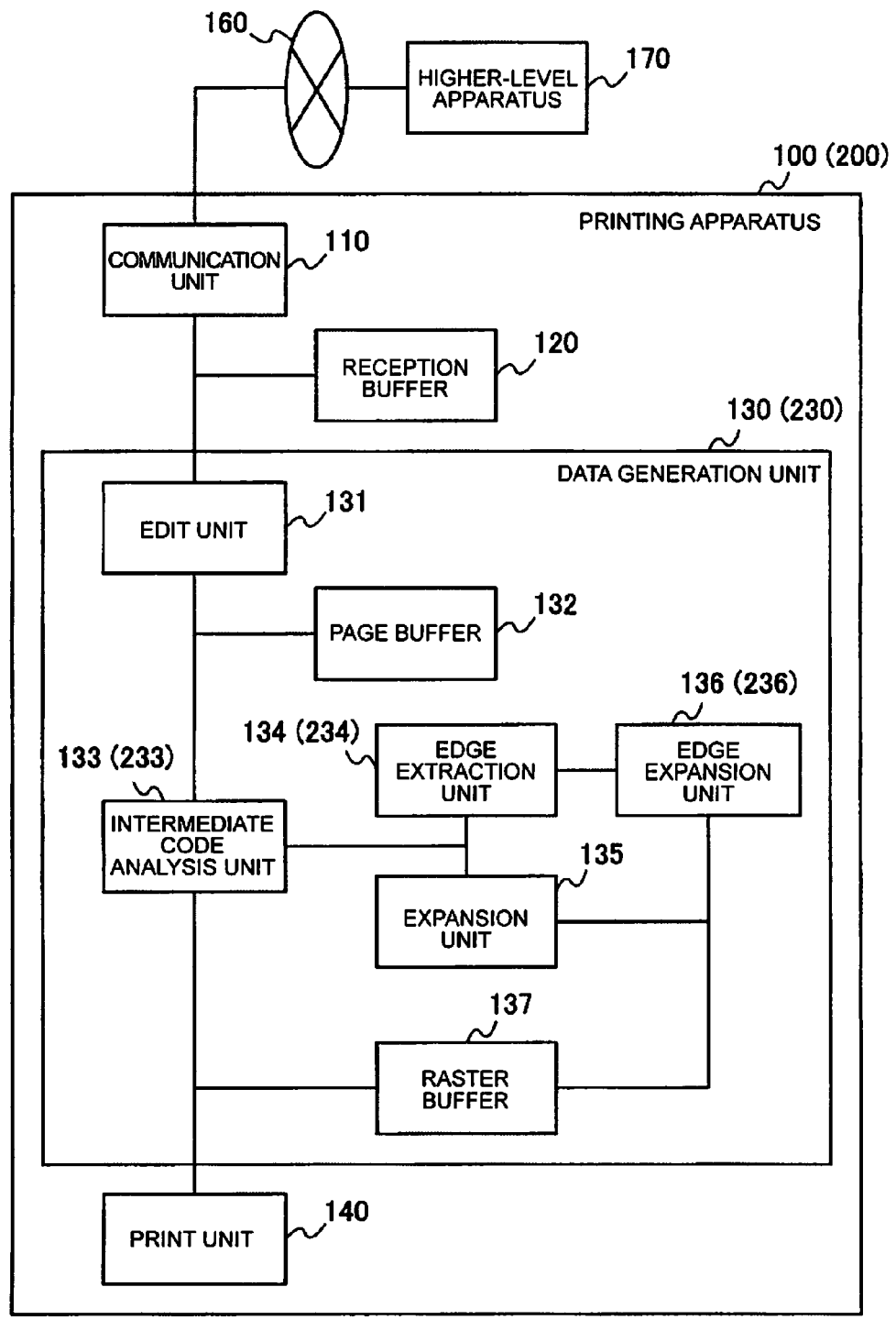
FIG. 1 is a block diagram schematically illustrating a configuration of a printing apparatus according to a first or a second embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinafter, an image formation apparatus and a method of forming an image to which the invention is applied are described with reference to the drawings.

First Embodiment (Explanation of Configuration)

FIG. 1 is a block diagram schematically illustrating a configuration of printing apparatus 100 as an image formation apparatus according to a first embodiment. Printing apparatus 100 executes a method of forming an image according to the first embodiment. Note that, reference numerals within parentheses in FIG. 1 indicate a configuration in a second embodiment. Printing apparatus 100 is provided with communication unit 110, reception buffer 120, data generation unit 130, and print unit 140. Herein, printing apparatus 100 is a printer, and is connected to higher-level apparatus 170 that is a PC via network 160.

Communication unit 110 functions as a reception unit that receives print data (image formation data) including a command expressed in page description language (PDL) or the like, from higher-level apparatus 170. For example, communication unit 110 receives print data from higher-level apparatus 170 via network 160. The print data is data giving an instruction to form an image. Note that, the print data in the first embodiment is data giving an instruction to form a color image that includes multiple image regions of different colors. Reception buffer 120 functions as a print data storage unit (image formation data storage unit) that houses therein the print data received by communication unit 110.

Data generation unit 130 generates image data for forming an image on the basis of the print data. The image data is data indicating pixel values of multiple image regions. Herein, data generation unit 130 generates image data in such a manner that, when a pixel value of one image region, out of the multiple image regions, is approximate to a pixel value of an image region adjacent to the one image region, a boundary between the one image region and the image region adjacent thereto is highlighted. Data generation unit 130 is provided with edit unit 131, page buffer 132, intermediate code analysis unit 133, edge extraction unit 134, expansion unit 135, edge expansion unit 136, and raster buffer 137.

Edit unit 131 generates intermediate code for rendering multiple image regions on the basis of print data. For example, edit unit 131 acquires a command per command unit from print data stored in reception buffer 120. Edit unit 131 generates intermediate code in accordance with the acquired command, and houses the generated intermediate code in page buffer 132. In the first embodiment, edit unit 131 converts, as a fill pattern, a command designating a foreground color of the color into intermediate code to print (form an image) in corresponding gray-scale. Moreover, when processing of commands for one page is completed, edit unit 131 notifies intermediate code analysis unit 133 of the completion of the editing. The intermediate code generated by edit unit 131 includes code such as foreground color intermediate code designating a foreground color, rectangle intermediate code for rendering a rectangle, trapezoid intermediate code for rendering a trapezoid, and the like. Moreover, the foreground color intermediate code includes a foreground color gradation value that is expressed in 256 gradations. In other words, foreground color intermediate code that includes a foreground color gradation value indicating a gradation value for gray, and rectangle intermediate code that is processed after the foreground color intermediate code, represent that an image region of a rectangle (object) indicated by the rectangle intermediate code is formed with the gradation value for gray corresponding to the foreground color intermediate code. Moreover, foreground color intermediate code, and trapezoid intermediate code that is processed after the foreground color intermediate code, represent that an image region of a trapezoid (object) indicated by the trapezoid intermediate code is formed with the gradation value for gray corresponding to the foreground color intermediate code. In other words, the intermediate code generated by the edit unit 131 includes: a foreground color intermediate code indicating a gradation value, and an intermediate code indicating a graphic to be rendered with the gradation value. Page buffer 132 functions as an intermediate code storage unit that stores therein the intermediate code generated by the edit unit 131.

Intermediate code analysis unit 133 analyzes the intermediate code stored in page buffer 132 to specify areas to be rendered (hereinafter, "render area(s)") and specify pixel values of multiple image regions that are instructed to be formed with the print data. Moreover, intermediate code analysis unit 133 analyzes the intermediate code stored in page buffer 132 to perform the processing in accordance with the analyzed result. For example, when the analyzed intermediate code is foreground color intermediate code, intermediate code analysis unit 133 updates a state such that expansion processing is performed thereafter with reference to the foreground color, and updates the foreground color gradation value setting in accordance with a foreground color gradation value included in the analyzed foreground color intermediate code. The foreground color gradation value becomes a pixel value of an image region to be formed. Further, if, when analyzing rectangle intermediate code or trapezoid intermediate code, the operation is in the state where the expansion processing is performed with reference to the foreground color, intermediate code analysis unit 133 supplies information on a render area corresponding to the intermediate code to edge extraction unit 134, and requests the intermediate code expansion of edge extraction unit 134. If the operation is not in the state where the expansion processing is performed with reference to the foreground color, or an image other than a graphic of the rectangle, the trapezoid, or the like is rendered, intermediate code analysis unit 133 supplies the information on the render area to expansion unit 135, and requests the intermediate code expansion of expansion unit 135. For example, information on the render area of a rectangle includes upper-left coordinates and lower-right coordinates for the rectangle to be rendered. Information on the render area of a trapezoid includes coordinates for the trapezoid to be rendered, the coordinates including y-coordinate yT of an upper base, left-edge x-coordinate xL of the upper base, right-edge x-coordinate xR of the upper base, y-coordinate yB of a lower base, left-side inclination dxL, and right-side inclination dxR. The left-side and right-side x-coordinates between the upper base and the lower base of the trapezoid to be rendered can be calculated. For example, left-side x-coordinate xcL and right-side x-coordinate xcR in y-coordinate yc that is present between y-coordinate yT and y-coordinate yB are calculated by expressions (1) and (2) below. Note that, decimals are omitted.

$$xcL = xL + (yT - yc) \times dxL \quad (1)$$

$$xcR = xR + (yT - yc) \times dxR \quad (2)$$

Herein, the left-side inclination dxL and the right-side inclination dxR indicate the ratio ($\Delta x/\Delta y$) of the changing amount in the x-axis relative to the changing amount in the y-axis. Further, after processing the intermediate code for one page, intermediate code analysis unit 133 notifies print unit 140 of the completion of the expansion.

Edge extraction unit 134 extracts each pixel that is to form an edge of an image region to be formed. For example, edge extraction unit 134 extracts, using information on a render area supplied from intermediate code analysis unit 133, an image region that is to form an edge of a graphic per unit of a graphic to be rendered with the intermediate code. Edge extraction unit 134 then requests the expansion of the pixel serving as the edge of the graphic of edge expansion unit 136. Edge extraction unit 134 requests the expansion of a pixel that does not become an edge of the graphic of expansion unit 135.

Expansion unit 135 specifies pixel values for the pixels that are specified by intermediate code analysis unit 133, and edge extraction unit 134 or edge expansion unit 136 on the basis of the intermediate code. For example, when intermediate code analysis unit 133 requests the intermediate code expansion of expansion unit 135, expansion unit 135 updates, while referring to the fill designation, such as a foreground color or a pattern at that time, a pixel value of the pixel that is designated with the information on the render area in an expansion result stored region in the per page unit that is secured on raster buffer 137. Note that, each pixel is expressed by a pixel value of 256 gradations in a region where an expansion result is stored. Moreover, when edge extraction unit 134 or edge expansion unit 136 requests expansion of expansion unit 135, expansion unit 135 updates, while referring to the fill designation, such as a foreground color or a pattern with respect to a pixel designated, a pixel value of the pixel. For example, when the fill designation indicates a foreground color, expansion unit 135 refers to a foreground color gradation value at that time to update a pixel value of a render target pixel to the foreground color gradation value.

Edge expansion unit 136 specifies, out of the multiple image regions included in the print data, when a pixel value of one image region is approximate to a pixel value of an image region adjacent to the one image region. A pixel value of a pixel that is to form an edge is extracted by edge extraction unit 134 such that a boundary between the one image region and the adjacent image region is highlighted. For example, when edge extraction unit 134 requests an expansion of edge expansion unit 136, edge expansion unit 136 performs a rendering while referring to the pixel value of the render target pixel to be rendered on raster buffer 137 and the foreground color gradation value. If the pixel value of the render target pixel is 0, edge expansion unit 136 determines that no rendering is performed on the pixel, and requests an expansion of expansion unit 135. If the pixel value of the render target pixel is not 0, edge expansion unit 136 compares the foreground color gradation value with a pixel value initially set for the render target pixel. If a difference therebetween is equal to or more than a preset value (hereinafter, also referred to as a first value), edge expansion unit 136 determines that a difference in gradation is sufficient, and requests an expansion of expansion unit 135. If the difference in gradation is less than the first value, edge expansion unit 136 updates the pixel value of the render target pixel to a pixel value for highlighting a boundary with an adjacent image region. Herein, the first value is, for example, 10. Moreover, when the boundary is highlighted, edge expansion unit 136 changes a pixel value for highlighting the boundary in accordance with a value of the foreground color gradation value. The pixel value for highlighting the boundary is preferably set to a value different from the foreground color gradation value and the pixel value of the adjacent image region (pixel value initially set for the render target pixel). For example, when the boundary is highlighted, if the foreground color gradation value is equal to or more than a preset value (hereinafter, also referred to as a second value), edge expansion unit 136 updates the pixel value of the render target pixel so as to indicate a lighter color than a color indicated by the foreground color gradation value (for example, to 0). If the foreground color gradation value is less than the second value, edge expansion unit 136 updates the pixel value of the render target pixel so as to indicate a darker color than a color indicated by the foreground color gradation value (for example, to 255). Herein, the second value is, for example, 128.

Raster buffer 137 functions as an image data storage unit that stores therein image data that is an expansion result in which a pixel value of each pixel is expressed in 256 gradations per page unit. Print unit 140 is an image formation unit that forms an image on a recording medium on the basis of the image data stored in raster buffer 137 when being notified of the completion of the expansion from intermediate code analysis unit 133. Print unit 140 forms an image including multiple image regions that are instructed to be formed by the print data on a recording medium.

(Explanation of Operation)

Figure 2:
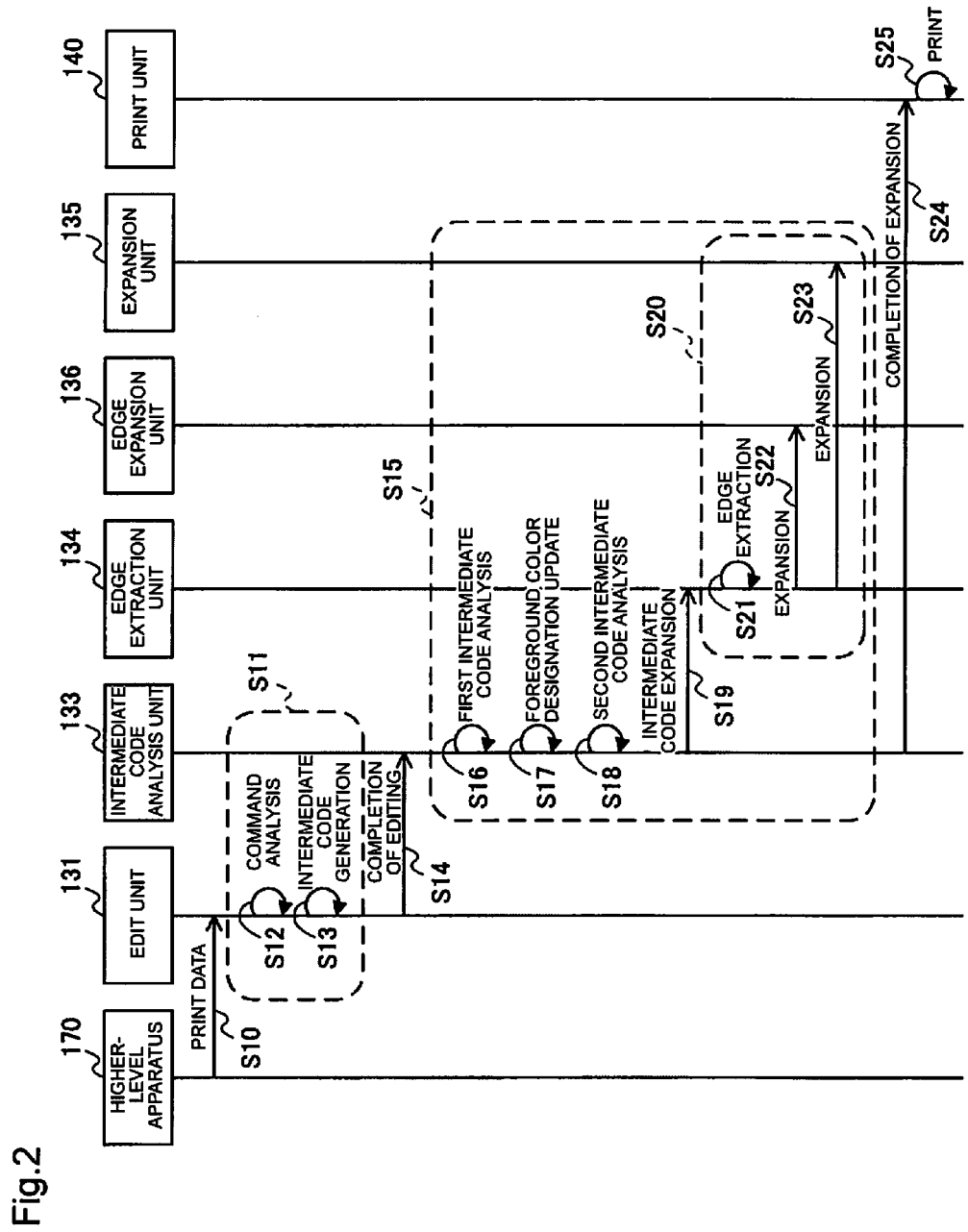
FIG. 2 is a sequence diagram illustrating a processing flow of the printing apparatus according to the first embodiment.

Hereinafter, an operation of printing apparatus 100 according to the first embodiment is described. FIG. 2 is a sequence diagram illustrating a processing flow of printing apparatus 100 according to the first embodiment. Higher-level apparatus 170 transmits, in response to an instruction by a user, print data via network 160 to printing apparatus 100 (S10). The print data transmitted at this time includes, a command designating (C, M, Y, K)=(0x00, 0xFF, 0xFF, 0x00) as respective components of cyan (C), magenta (M), yellow (Y), and black (K) for the fill designation of a foreground color, a command to perform rendering in a trapezoidal shape, and a command to perform rendering in a rectangular shape. Communication unit 110 in printing apparatus 100 receives the print data transmitted from higher-level apparatus 170. Communication unit 110 houses the received print data in reception buffer 120.

Edit unit 131 performs analysis processing of the print data stored in reception buffer 120 (S11). The analysis processing of the print data includes a command analysis (S12), and intermediate code generation (S13).

Edit unit 131 extracts commands from the print data stored in reception buffer 120, and analyzes the extracted commands (S12). For example, upon starting the command analysis, edit unit 131 refers to a head command in the print data stored in reception buffer 120, and analyzes the command. Herein, the command is regarded as a command designating (C, M, Y, K)=(0x00, 0xFF, 0xFF, 0x00) for the fill designation of the foreground color. In such a case, edit unit 131 converts the designated foreground color in gray-scale. For example, edit unit 131 temporarily converts data of a component C, a component M, a component Y, and a component K into an RGB value. Herein, the converted value becomes (R, G, B)=(255, 0, 0). Further, edit unit 131 coverts the RGB value into a k value using a conversion expression (3) below. Note that, decimals are rounded off.

[Expression 1]

$$K = 255 - 255\left(\frac{0.3R}{255} + \frac{0.59G}{255} + \frac{0.11B}{255}\right) \quad (3)$$

Further, edit unit 131 generates foreground color intermediate code that designates a converted result (K)=(0xB3) as a foreground color gradation value, and houses the foreground color intermediate code in the page buffer 132 (S13). Thereafter, edit unit 131 similarly reads a command per command unit from the print data stored in reception buffer 120, analyzes the read command (S12), and generates intermediate code on the basis of the analyzed result and houses the intermediate code in page buffer 132 (S13). Edit unit 131 repeats the command analysis (S12) and the intermediate code generation (S13) before commands for one page are processed.

After completing the processing of the commands for one page, edit unit 131 notifies intermediate code analysis unit 133 of the completion of the editing (S14).

Upon being notified of the completion of the editing from edit unit 131, intermediate code analysis unit 133, edge extraction unit 134, expansion unit 135, and edge expansion unit 136 perform image data generation processing (S15). The image data generation processing includes a first intermediate code analysis (S16), a foreground color designation update (S17), a second intermediate code analysis (S18), intermediate code expansion (S19), and edge extraction and expansion processing (S20).

Intermediate code analysis unit 133 acquires intermediate code stored in page buffer 132, and performs the first intermediate code analysis (S16). For example, a head intermediate code stored in page buffer 132 is foreground color intermediate code that is intermediate code designating (K)= (0xB3) as a foreground color gradation value. Accordingly, intermediate code analysis unit 133 sets the operation in a state to fill with the foreground color, and updates the foreground color gradation value to (K)=(0xB3) (S17).

Intermediate code analysis unit 133 then acquires a next intermediate code stored in page buffer 132, and performs the second intermediate code analysis (S18). The next intermediate code is, for example, a trapezoid intermediate code that satisfies yT=300xL, 100xR=400, yB=500, dxL=−0.25, and dxR=0.25. Because the operation is in the state to fill with the foreground color at steps S16 and S17, intermediate code analysis unit 133 notifies edge extraction unit 134 of intermediate code expansion with information on a render area (S19).

Upon being notified about the intermediate code expansion from intermediate code analysis unit 133, edge extraction unit 134, edge expansion unit 136, and expansion unit 135 perform edge extraction and expansion processing (S20). The edge extraction and expansion processing includes an edge extraction (S21), a first expansion (S22), and a second expansion (S23). Edge extraction unit 134 performs the edge extraction on the basis of the information on the render area notified from intermediate code analysis unit 133 (S21). Edge extraction unit 134 requests expansion of a pixel that is determined as an edge of edge expansion unit 136 (S22). Edge expansion unit 136 performs the expansion processing on the requested pixel, and specifies a pixel value of the pixel. On the other hand, edge extraction unit 134 requests expansion of a pixel that is not determined as an edge of expansion unit 135 (S23). Expansion unit 135 performs the expansion processing on the requested pixel, and specifies the pixel value of the pixel. Intermediate code analysis unit 133, edge extraction unit 134, edge expansion unit 136, and expansion unit 135 carry out processing similar to the above before no intermediate code stored in page buffer 132 remains. Note that, the edge extraction and expansion processing (S20) is described in detail with reference to FIG. 3 to FIG. 6.

Further, after completing the processing of all the intermediate code stored in page buffer 132, intermediate code analysis unit 133 then notifies print unit 140 of the completion of the expansion (S24). Print unit 140 performs the printing on the basis of the image data stored in raster buffer 137 that is an expansion result (S25).

Figure 3:
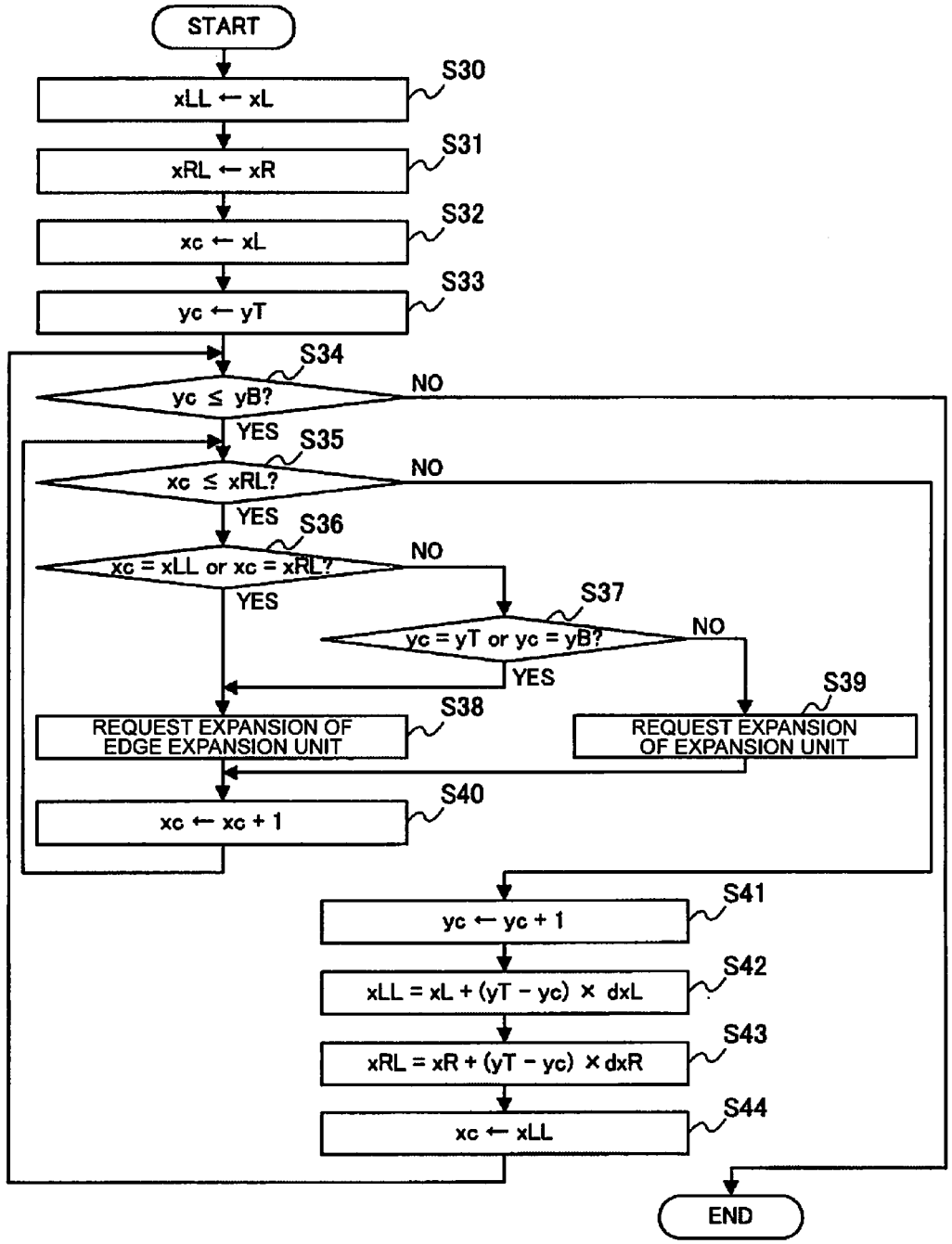
FIG. 3 is a flowchart illustrating edge extraction and expansion processing when the intermediate code is code for rendering a trapezoid in the first embodiment.

FIG. 3 is a flowchart illustrating edge extraction and expansion processing when intermediate code is code for rendering a trapezoid. Note that, assuming that an origin point is disposed left upward, an x-axis is disposed in the right direction from the origin point, and a y-axis is disposed downward from the origin point in a coordinate system herein. Firstly, edge extraction unit 134 performs various kinds of initialization for the edge extraction processing (S30 to S33). For example, edge extraction unit 134 updates value xLL indicating a left-edge x-coordinate of the trapezoid in a given y-coordinate to a value (for example, 100) of a left-edge x-coordinate xL of an upper base of the trapezoid (S30). Moreover, edge extraction unit 134 updates value xRL indicating a right-edge x-coordinate of the trapezoid in the given y-coordinate to a value (for example, 400) of a right-edge x-coordinate xR of the upper base of the trapezoid (S31). In addition, edge extraction unit 134 updates value xc indicating the x-coordinate of a render target pixel that is currently rendered to the value (for example, 100) of the xL (S32). In addition, edge extraction unit 134 updates value yc indicating the y-coordinate of the render target pixel that is currently rendered to a value (for example, 300) of a y-coordinate yT of the upper base of the trapezoid (S33).

Next, edge extraction unit 134 determines whether or not value yc in the y-coordinate of the render target pixel is equal to or less than value yB in the y-coordinate of the lower base of the trapezoid to be rendered (S34). If value yc is equal to or less than value yB (S34: Yes), an edge to be detected remains in the trapezoid to be rendered, and thus the processing proceeds to Step S35. If value yc is more than value yB (S34: No), the edge detection is completed in the entire trapezoid to be rendered, and thus the flow is completed.

At Step S35, edge extraction unit 134 determines whether or not value xc in the x-coordinate of the render target pixel is equal to or less than value xRL of the right-edge x-coordinate corresponding to value yc in the y-coordinate of the render target pixel. If value xc is equal to or less than value xRL (S35: Yes), an edge to be detected corresponding to value yc remains, and thus the processing progresses to Step S36. If value xc is more than value xRL (S35: No), all the edges corresponding to value yc are completed to be detected, and thus the processing proceeds to Step S41.

At Step S36, edge extraction unit 134 determines whether or not value xc in the x-coordinate of the render target pixel is value xLL of the left-edge x-coordinate or value xRL of the right edge x-coordinate, corresponding to value yc in the y-coordinate of the render target pixel. If value xc is value xLL or value xRL (S36: Yes), the render target pixel is an edge, and thus the processing proceeds to Step S38. If value xc is neither value xLL nor value xRL (S36: No), the processing proceeds to Step S37.

At Step S37, edge extraction unit 134 determines whether or not value yc in the y-coordinate of the render target pixel is value yT in the y-coordinate of the upper base of the trapezoid to be rendered or value yB in the y-coordinate of the lower base thereof. If value yc is value yT or value yB (S37: Yes), the render target coordinate is an edge, and thus the processing proceeds to Step S38. If value yc is neither value yT nor value yB (S37: No), the render target coordinate is not an edge, and thus the processing proceeds to Step S39.

At Step S38, edge extraction unit 134 determines that the render target pixel is an edge of the trapezoid to be rendered, and requests the expansion of edge expansion unit 136. Processing of edge expansion unit 136 when the expansion is requested is described in detail with reference to FIG. 5. The processing then proceeds to Step S40.

At Step S39, edge extraction unit 134 determines that the render target pixel is not an edge of the trapezoid to be rendered, and requests the expansion of expansion unit 135. Expansion unit 135 that receives such a request updates the pixel value of the render target pixel to the value of the foreground color gradation value that is updated at Step S17 in FIG. 2. The processing then proceeds to Step S40.

At Step S40, edge extraction unit 134 adds 1 to value xc in the x-coordinate of the render target pixel. The processing then returns to Step S34.

If value xc is more than value xRL at Step S35 (S35: No), value xc in the x-coordinate of the render target pixel is more than value xRL in the right-edge x-coordinate of the trapezoid to be rendered, and thus edge extraction unit 134 can determine that all the edges corresponding to value yc are completed to be detected. Accordingly, edge extraction unit 134 advances the processing to Step S41, and adds 1 to value yc in the y-coordinate of the render target pixel.

Edge extraction unit 134 then updates value xLL indicating the left-edge x-coordinate of the trapezoid to be rendered and corresponding to value yc in the y-coordinate of the render target pixel to value xcL that is calculated by expression (1) described above (S42). Moreover, edge extraction unit 134 updates value xRL, indicating the right-edge x-coordinate of the trapezoid to be rendered and corresponding to value yc in the y-coordinate of the render target pixel, to value xcR that is calculated by expression (2) described above (S43). Edge extraction unit 134 then updates value xc in the x-coordinate of the render target pixel to value xLL indicating the left-edge x-coordinate and corresponding to value yc (S44). The processing then returns to Step S34.

Figure 4:
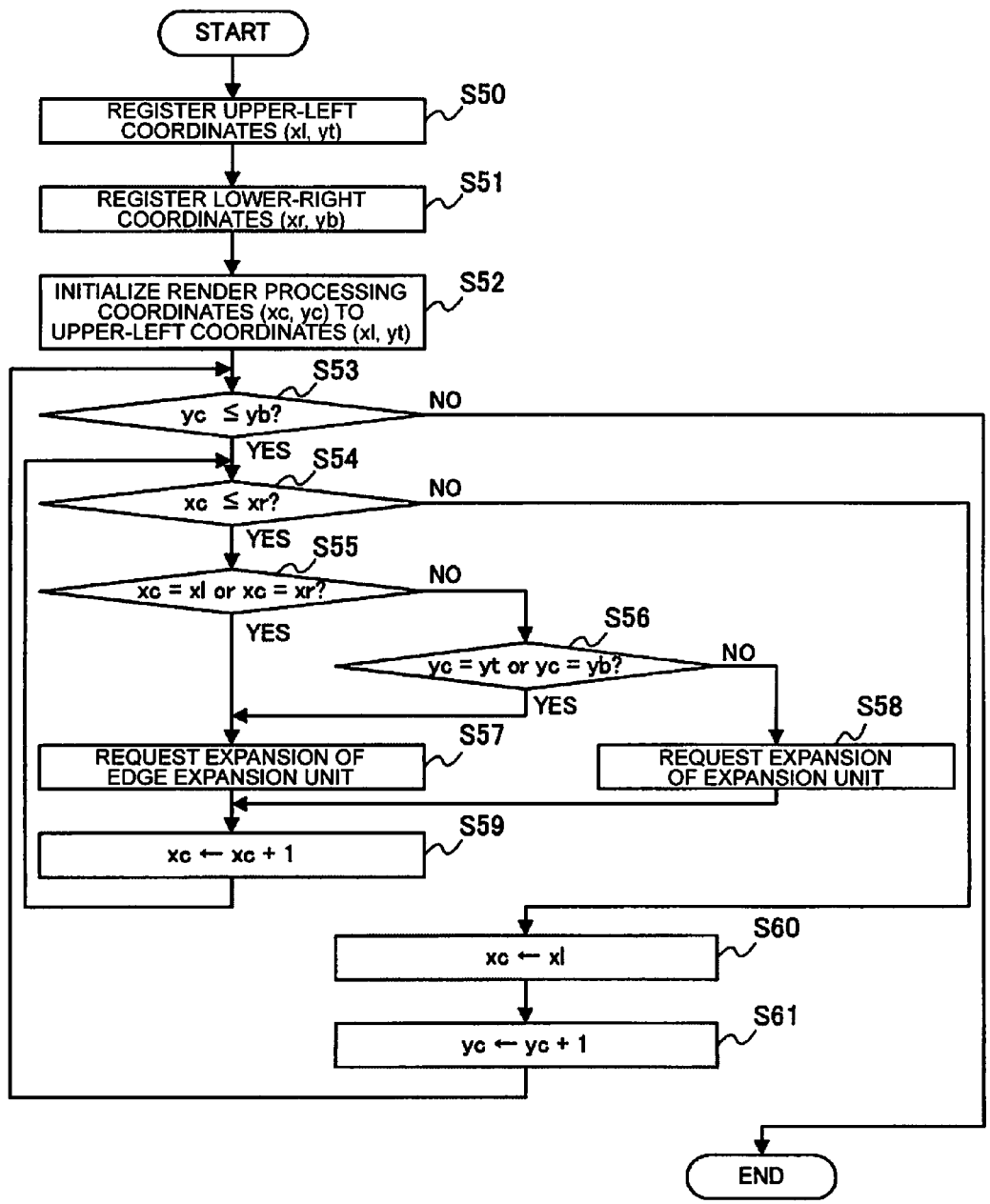
FIG. 4 is a flowchart illustrating edge extraction and expansion processing when the intermediate code is code for rendering a rectangle in the first embodiment.

FIG. 4 is a flowchart illustrating edge extraction and expansion processing when intermediate code is code for rendering a rectangle. Note that, assuming that an origin point is disposed left upward, an x-axis is disposed in the right direction from the origin point, and a y-axis is disposed downward from the origin point also in a coordinate system herein.

Firstly, edge extraction unit 134 performs various kinds of initialization for the edge extraction processing (S50 to S52). For example, edge extraction unit 134 registers upper-left coordinates (xl, yt) of the rectangle to be rendered (S50). Next, edge extraction unit 134 registers lower-right coordinates (xr, yb) of the rectangle to be rendered (S51). Edge extraction unit 134 then initializes render target coordinates (xc, yc) that are processing coordinates to upper-left coordinates (xl, yt) that are registered at Step S50 (S52).

Next, edge extraction unit 134 determines whether or not value yc in the y-coordinate of the render target pixel is equal to or less than value yb in the lower-right y-coordinate of the rectangle to be rendered (S53). If value yc is equal to or less than value yb (S53: Yes), an edge to be detected remains in the rectangle to be rendered, and thus the processing proceeds to Step S54. If value yc is more than value yb (S53: No), the edge detection is completed in the entire rectangle to be rendered, and thus the flow is completed.

At Step S54, edge extraction unit 134 determines whether or not value xc in the x-coordinate of the render target pixel is equal to or less than value xr in the lower-right x-coordinate of the rectangle to be rendered. If value xc is equal to or less than value xr (S54: Yes), an edge to be detected corresponding to value yc remains, and thus the processing proceeds to Step S55. If value xc is more than value xr (S54: No), all the edges corresponding to value yc are completed to be detected, and thus the processing proceeds to Step S60.

At Step S55, edge extraction unit 134 determines whether or not value xc in the x-coordinate of the render target pixel is value xl in the upper-left x-coordinate of the rectangle to be rendered or value xr in the lower-right x-coordinate. If value xc is value xl or value xr (S55: Yes), the render target pixel is an edge, and thus the processing proceeds to Step S57. If value xc is neither value xl nor value xr (S55: No), the processing proceeds to Step S56.

At Step S56, edge extraction unit 134 determines whether or not value yc in the y-coordinate of the render target pixel is value yt in the upper-left y-coordinate of the rectangle to be rendered or value yb in the lower-right y-coordinate thereof. If value yc is value yt or value yb (S56: Yes), the render target pixel is an edge, and thus the processing proceeds to Step S57. If value yc is neither value yt nor value yb (S56: No), the processing proceeds to Step S58.

At Step S57, edge extraction unit 134 determines that the render target pixel is an edge of the rectangle to be rendered, and requests the expansion of edge expansion unit 136. Processing of edge expansion unit 136 when the expansion is requested is described in detail with reference to FIG. 5. The processing then proceeds to Step S59.

At Step S58, edge extraction unit 134 determines that the render target pixel is not an edge of the rectangle to be rendered, and requests the expansion of expansion unit 135. Expansion unit 135 that receives such a request updates the pixel value of the render target pixel to the value of the foreground color gradation value that is updated at Step S17 in FIG. 2. The processing then proceeds to Step S59.

At Step S59, edge extraction unit 134 adds 1 to value xc in the x-coordinate of the render target pixel. The processing then returns to Step S54.

If value xc is more than value xr at Step S54 (S54: No), value xc in the x-coordinate of the render target pixel is more than value xr in the right-edge x-coordinate of the rectangle to be rendered, and thus edge extraction unit 134 can determine that all the edges corresponding to value yc are completed to be detected. Accordingly, edge extraction unit 134 advances the processing to Step S60, and updates value xc in the x-coordinate of the render target pixel to value xl in the left-edge x-coordinate of the rectangle to be rendered (S60). Moreover, edge extraction unit 134 adds 1 to value yc in the y-coordinate of the render target pixel (S61). The processing then returns to Step S53.

Figure 5:
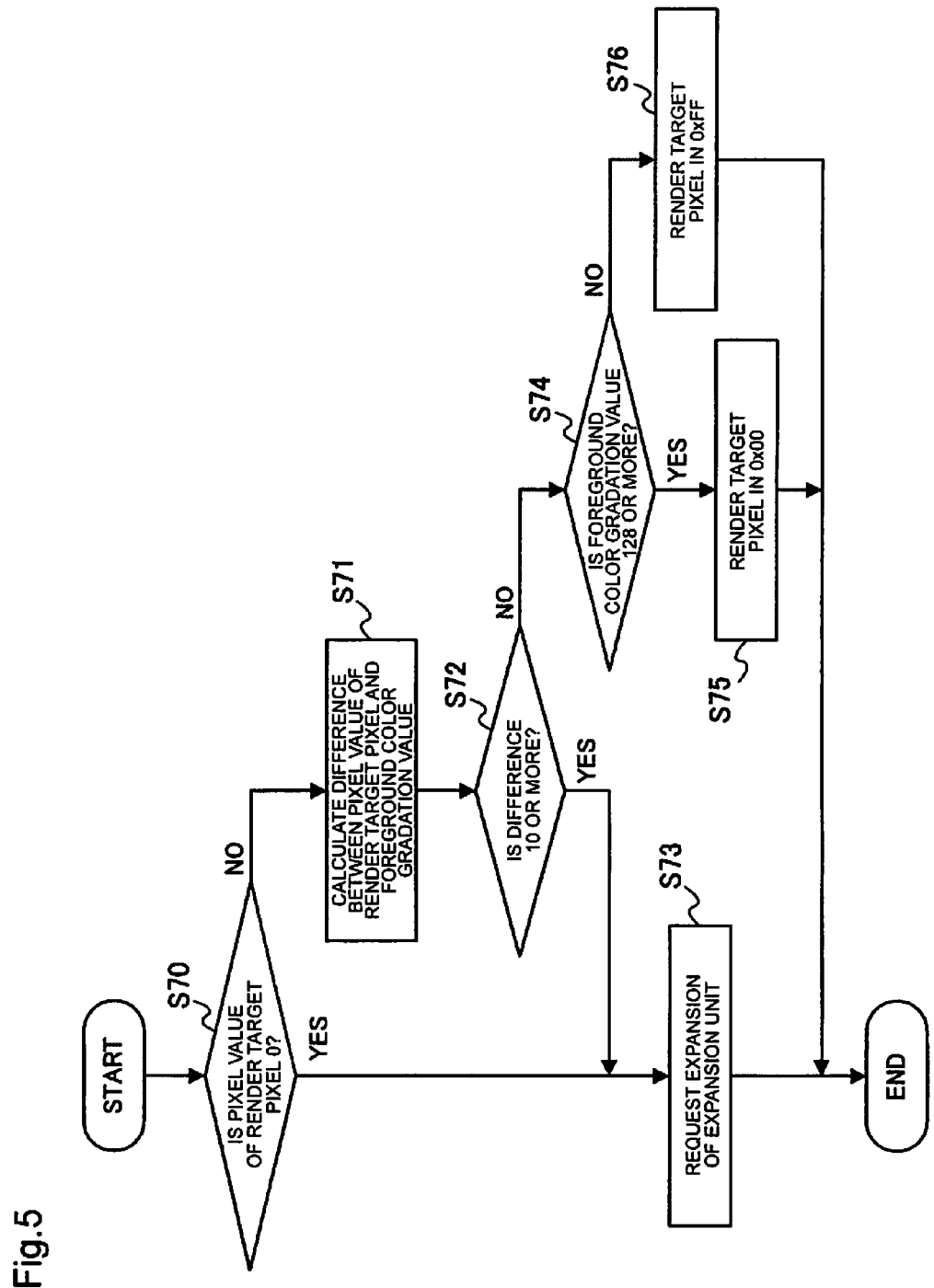
FIG. 5 is a flowchart illustrating expansion processing by an edge expansion unit in the first embodiment.

FIG. 5 is a flowchart illustrating the expansion processing by edge expansion unit 136. Note that, assuming that an initial value of a pixel value of each pixel stored in raster buffer 137 is 0. Firstly, edge expansion unit 136 determines whether or not the pixel value of the render target pixel that is already stored (set) in raster buffer 137 is 0 (S70). If the pixel value of the render target pixel is 0 (S70: Yes), edge expansion unit 136 determines that the render target pixel is not adjacent to another image region, and the processing proceeds to Step S73. On the other hand, if the pixel value of the render target pixel is not 0 (S70: No), edge expansion unit 136 determines that the render target pixel is adjacent to another image region, and the processing proceeds to Step S71.

At Step S71, edge expansion unit 136 calculates a difference between the pixel value of the render target pixel that is already stored in raster buffer 137 and the foreground color gradation value that is updated by intermediate code analysis unit 133. Edge expansion unit 136 then determines whether or not the difference calculated at Step S71 is equal to or more than a preset value (for example, 10) (S72). If the difference is equal to or more than the preset value (S72: Yes), edge expansion unit 136 determines that colors of the adjacent image regions are not approximate to each other, and the processing proceeds to Step S73. On the other hand, if the difference is less than the preset value (S72: No), edge expansion unit 136 determines that colors of the adjacent image regions are approximate to each other, and the processing proceeds to Step S74.

At Step S73, an image region to be rendered at this time can be easily identified because the image region to be rendered at this time is not adjacent to another image region, or the color of the image region to be rendered at this time and the color of the adjacent image region are not approximate to each other. Accordingly, edge expansion unit 136 requests the expansion of expansion unit 135. Expansion unit 135 that receives such a request updates the pixel value of the render target pixel to the value of the foreground color gradation value that is updated by intermediate code analysis unit 133.

On the other hand, a boundary needs to be highlighted at Step S74 because the image region to be rendered at this time is not adjacent to another image region, or the color of the image region to be rendered at this time and the color of the adjacent image region are approximate to each other. Accordingly, edge expansion unit 136 determines whether or not the foreground color gradation value that is updated by intermediate code analysis unit 133 is equal to or more than a preset value (for example, 128). If the foreground color gradation value is equal to or more than the preset value (S74: Yes), the processing then proceeds to Step S75. On the other hand, if the foreground color gradation value is less than the preset value (S74: No), the processing proceeds to Step S76.

At Step S75, edge expansion unit 136 determines that the color of the image region to be rendered at this time is a dark color, and sets the color of the pixel value of the render target pixel that is already stored in raster buffer 137 as a lighter color than the color of the image region to be rendered at this time, for example, 0. Note that, the smaller the pixel value is, the lighter the color becomes. On the other hand, at Step S76, edge expansion unit 136 determines that the color of the image region to be rendered at this time is a light color, and sets the pixel value of the render target pixel that is already stored in raster buffer 137 as a darker color than the color of the image region to be rendered at this time, for example, 255. Note that, the larger the pixel value is, the darker the color becomes.

Figure 6:
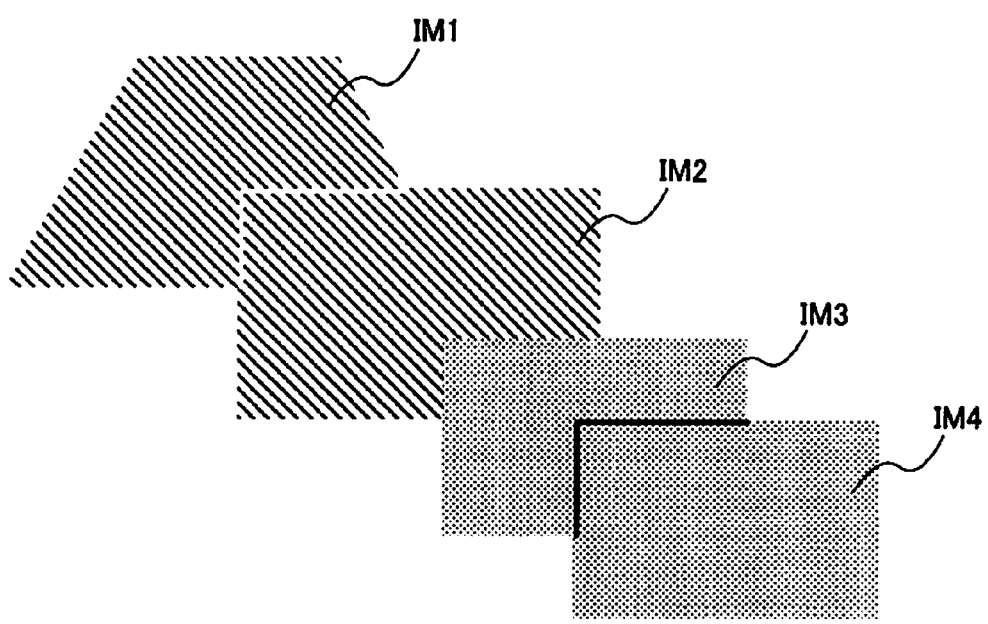
FIG. 6 is a schematic view illustrating an example of image data generated by the first embodiment.

FIG. 6 illustrates an example of image data that is expanded and generated from print data, for example, in which one trapezoidal image region and three rectangular image regions are rendered through the processing described in the foregoing. As illustrated in FIG. 6, trapezoidal image region IM1 and rectangular image region IM2 are adjacent to each other and pixel values (foreground color gradation values) of theses image regions are approximate to each other. Accordingly, a part of an edge of image region IM2 that is rendered after image region IM1 is rendered is highlighted. Herein, a pixel value in the part of the edge is set to 0 (white color) because image region IM2 is rendered in a relatively dark color. Meanwhile, although rectangular image region IM2 and rectangular image region IM3 are adjacent to each other, pixel values (foreground color gradation values) of these image regions are not approximate to each other. Accordingly, an edge is not highlighted. Moreover, rectangular image region IM3 and rectangular image region IM4 are adjacent to each other and pixel values (foreground color gradation values) of these image regions are approximate to each other. Accordingly, a part of an edge of image region IM4 that is rendered after image region IM3 is rendered is highlighted. Herein, a pixel value in the part of the edge is set to 255 (black color) because image region IM4 is rendered in a relatively light color.

As in the foregoing, with the first embodiment, the edge of the image region to be rendered is highlighted only in a portion where gradation values are approximate when images are rendered in gray color and the rendered images are overlapped with each other. In addition, the highlighted edge is rendered in a color easy to visually identify in accordance with the fill color. Accordingly, the shape can be maintained similar to an output result when no edge is highlighted, and can enhance the visual identification of the portion where the images are rendered in the similar colors.

In the first embodiment described in the foregoing, and as illustrated in FIG. 5, although edge expansion unit 136 performs the processing using the pixel value initially set in the render target coordinates, the invention is not limited to such an example. For example, among pixels of image regions adjacent to one image region included in multiple image regions, the processing may be performed using a pixel adjacent to a pixel that is to form an edge of the one image region. Specifically, edge expansion unit 136 may perform the processing illustrated in FIG. 5 using a pixel value initially set in coordinates outside a graphic to be rendered, instead of a pixel value initially set in the render target coordinates. In such a case, edge expansion unit 136 may use, out of surrounding pixels of the render target pixel, a pixel outside the image region to be rendered. For example, when xc=xLL is determined at Step S36 in FIG. 3, the render target pixel is positioned in the left side of the trapezoid to be rendered. Accordingly, edge expansion unit 136 may use a pixel value of a pixel adjacent to the left of the render target pixel. Moreover, when xc=xRL is determined at Step S36 in FIG. 3, the render target pixel is positioned in the right side of the trapezoid to be rendered. Accordingly, edge expansion unit 136 may use a pixel value of a pixel adjacent to the right of the render target pixel. In addition, when yc=yT is determined at Step S37 in FIG. 3, the render target pixel is positioned in the upper base of the trapezoid to be rendered. Accordingly, edge expansion unit 136 may use a pixel value of a pixel above by one pixel relative to the render target pixel. In addition, when yc=yB is determined at Step S37 in FIG. 3, the render target pixel is positioned in the lower base of the trapezoid to be rendered. Accordingly, edge expansion unit 136 may use a pixel value of a pixel below by one pixel relative to the render target pixel. In the case where a graphic to be rendered is a rectangle, edge expansion unit 136 similarly may use a pixel value of a pixel adjacent to the left of a render target pixel when the render target pixel is positioned in the left side of the rectangle, a pixel value of a pixel adjacent to the right of a render target pixel when the render target pixel is positioned in the right side of the rectangle, a pixel value of a pixel above by one pixel relative to a render target pixel when the render target pixel is positioned in the upper side of the rectangle, and a pixel value of a pixel below by one pixel relative to a render target pixel when the render target pixel is positioned in the lower side of the rectangle.

Second Embodiment (Explanation of Configuration)

As illustrated in FIG. 1, printing apparatus 200 as an image formation apparatus according to the second embodiment is provided with communication unit 110, reception buffer 120, data generation unit 230, and print unit 140. Printing apparatus 200 according to the second embodiment is different from printing apparatus 100 according to the first embodiment in the processing in data generation unit 230. Note that, printing apparatus 200 executes a method of forming an image according to the second embodiment.

Data generation unit 230 generates image data for forming an image on the basis of the print data. Data generation unit 230 is provided with edit unit 131, page buffer 132, intermediate code analysis unit 233, edge extraction unit 234, expansion unit 135, edge expansion unit 236, and raster buffer 137. Data generation unit 230 in the second embodiment is different from data generation unit 130 in the first embodiment in the processing in intermediate code analysis unit 233, edge extraction unit 234, and edge expansion unit 236.

Intermediate code analysis unit 233 performs processing similar to that in the first embodiment. In addition to the processing, when analyzing a text intermediate code in a state where expansion processing is performed with reference to the foreground color, intermediate code analysis unit 233 requests intermediate code expansion of edge extraction unit 234 with information on a render area corresponding to the intermediate code. Herein, the text intermediate code includes bit map data in which a character to be rendered is expressed by 0 and 1, and by render position information on the character. The render position information on the character is, for example, upper-left coordinates (xlT, ytT) and lower-right coordinates (xrT, ybT).

Edge extraction unit 234 performs a processing similar to that in the first embodiment, and in addition to the processing, extracts a pixel that is in an image region adjacent to one image region included in multiple image regions instructed to be formed by the print data and is to form an edge in contact with the one image region. For example, edge extraction unit 234 extracts, using information on a render area corresponding to the text intermediate code that is supplied from intermediate code analysis unit 233, a pixel that is to form an edge with the text per unit of a text to be rendered with the intermediate code. Further, edge extraction unit 234 requests the expansion of a pixel that is to form an edge with the text of edge expansion unit 236. Edge extraction unit 134 requests the expansion of pixels other than the pixel that is to form an edge with the text of expansion unit 135. For example, when bit map data of the text is 1 indicating to perform rendering in coordinates corresponding to render target coordinates, edge extraction unit 234 requests the expansion of expansion unit 13. When bit map data of the text is 0 indicating not to perform rendering in coordinates corresponding to render target coordinates, edge extraction unit 234 refers to values of the bit map data corresponding to up, down, left, and right pixels in the render target coordinates. If at least one pixel out of the referred bit map values is 1, edge extraction unit 234 requests a text pixel expansion of edge expansion unit 236. If all the referred bit map values are 0, edge extraction unit 234 determines that the pixel is a pixel that is not rendered, and moves to the processing of the next pixel. Edge extraction unit 234 repeats the processing as the above from the coordinates (xlT−1, ytT−1) to (xrT+1, YbT+1). Note that, a pixel in which no value of bit map data is present is regarded as the corresponding bit map value, being 0 all the time.

Edge expansion unit 236 performs processing similar to that by edge expansion unit 136 in the first embodiment, and in addition to the processing, performs text pixel expansion in response to a request from edge extraction unit 234. In the text pixel expansion, when a foreground color gradation value of a text to be rendered and a pixel value in a region adjacent to the text to be rendered are approximate to each other, edge expansion unit 236 specifies a pixel value of a pixel that is to form an edge in contact with the text to be rendered such that a boundary with the text to be rendered is highlighted. For example, when edge extraction unit 234 requests a text pixel expansion of edge expansion unit 236, edge expansion unit 236 compares the pixel value of the render target pixel with the foreground color gradation value. If the difference therebetween is equal to or more than a preset first value (for example, 10), edge expansion unit 236 does not update the pixel value of the render target pixel. On the other hand, if the difference is less than the preset first value, edge expansion unit 236 updates the pixel value of the render target pixel so as to be a pixel value with which a boundary with the text to be rendered is highlighted. Moreover, when the boundary is highlighted, edge expansion unit 236 changes the pixel value for highlighting the boundary in accordance with a value of the foreground color gradation value. The pixel value for highlighting the boundary is preferably set to a value different from the foreground color gradation value and the pixel value initially set for the render target pixel. For example, when the boundary is highlighted, if the foreground color gradation value is equal to or more than a preset second value (for example, 128), edge expansion unit 236 updates the pixel value of the render target pixel so as to indicate a lighter color than the color indicated by the foreground color gradation value (for example, to 0). In contrast, if the foreground color gradation value is less than the preset second value, edge expansion unit 236 updates the pixel value of the render target pixel so as to indicate a darker color than a color indicated by the foreground color gradation value (for example, to 255).

(Explanation of Operation)

Figure 7:
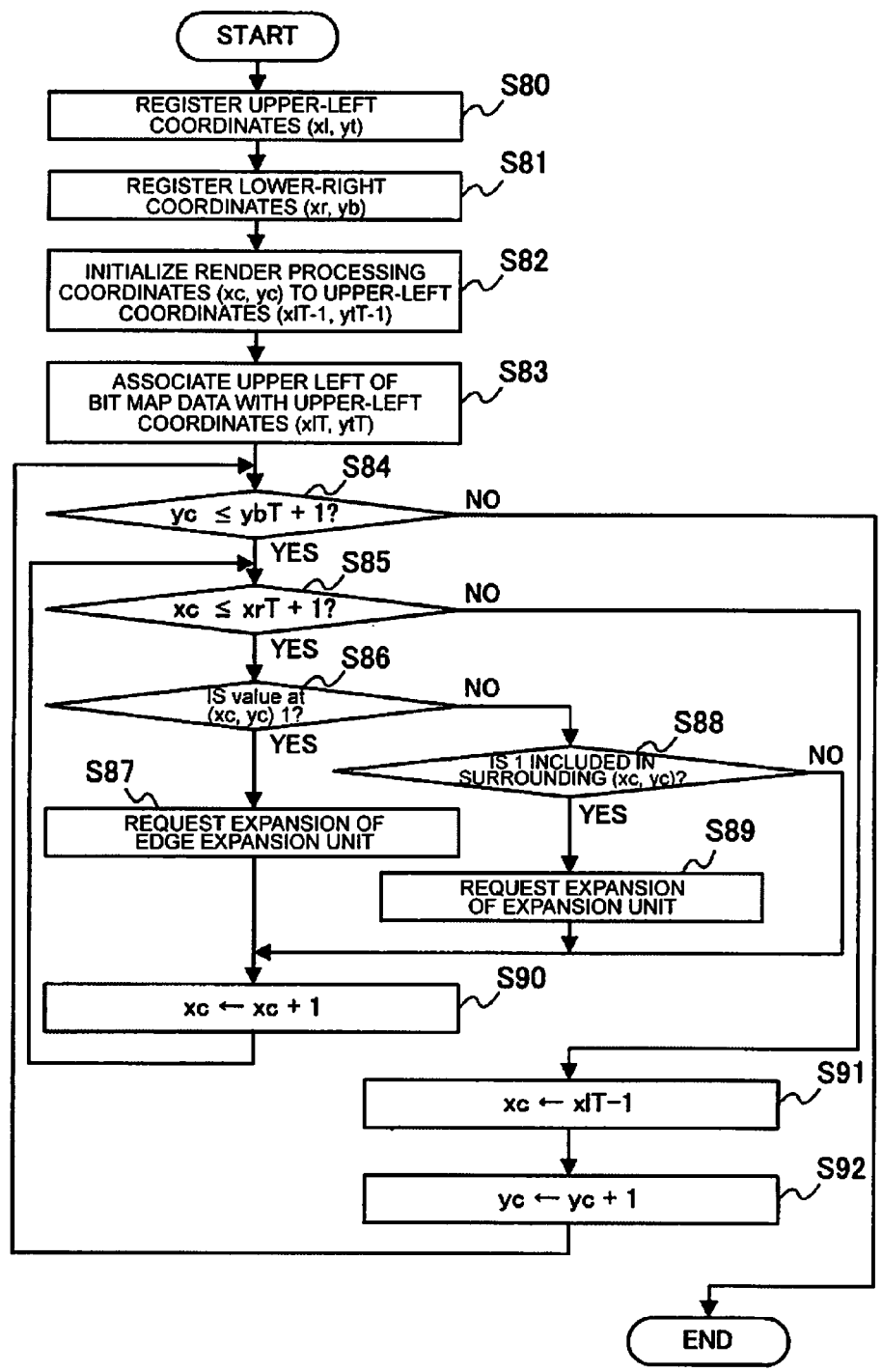
FIG. 7 is a flowchart illustrating edge extraction and expansion processing when the intermediate code is code for rendering a text in the second embodiment.

FIG. 7 is a flowchart illustrating edge extraction and expansion processing when intermediate code is the code for rendering a text. Note that, assuming that an origin point is disposed left upward, an x-axis is disposed in the right direction from the origin point, and a y-axis is disposed downward from the origin point also in a coordinate system herein.

Firstly, edge extraction unit 234 performs various kinds of initialization for the edge extraction processing (S80 to S83). For example, edge extraction unit 234 registers upper-left coordinates (xlT, ytT) of the text to be rendered (S80). Next, edge extraction unit 234 registers lower-right coordinates (xrT, ybT) of text to be rendered (S81). Further, edge extraction unit 234 initializes render target coordinates (xc, yc) that are processing coordinates to upper-left coordinates (xlT−1, ytT−1) in an enlarged region that are enlarged by one pixel from upper-left coordinates (xlT, ytT) registered at Step S80 (S82). Note that, an edge confirmation region is a region obtained by enlarging by one pixel a region specified by upper-left coordinates (xlT, ytT) and lower-right coordinates (xrT, ybT), in which the text is disposed. In addition, edge extraction unit 234 associates the upper left of bit map data of the text to be rendered with upper-left coordinates (xlT, ytT) registered at Step S80 (S83). With this, the bit map data of the text to be rendered and the render target coordinates are associated with each other. For example, when bit map data of coordinates moved from (xlT, ytT) by (x, y)=(10, 20) is referred, it can be understood whether or not rendering is performed for the coordinates by referring a bit map value at a position moved from the upper-left coordinates of the bit map data by (x, y)=(10, 20). If the corresponding bit map value is 1, the pixel is necessary to be rendered.

Next, edge extraction unit 234 determines whether or not value yc in the y-coordinate of the render target pixel is equal to or less than value ybT+1 in the lower-right y-coordinate of the edge confirmation region (S84). If value yc is equal to or less than value ybT+1 (S84: Yes), an edge to be detected remains in the edge confirmation region, and thus the processing proceeds to Step S85. If value yc is more than ybT+1 (S84: No), the edge detection is completed in the entire edge confirmation region, and thus the flow is completed.

At Step S85, edge extraction unit 234 determines whether or not value xc in the x-coordinate of the render target pixel is equal to or less than value xrT+1 in the right-edge x-coordinate in the edge confirmation region. If value xc is equal to or less than value xrT+1 (S85: Yes), an edge to be detected corresponding to value yc remains, and thus the processing proceeds to Step S86. If the value xc is more than value xrT+1 (S85: No), all the edges corresponding to value yc are completed to be detected, and thus the processing proceeds to Step S91.

At Step S86, edge extraction unit 234 confirms whether or not a value of the bit map data corresponding to the render target coordinates is 1. If the value of the bit map data corresponding to the render target coordinates is 1 (S86: Yes), the processing proceeds to Step S87. if the value of the bit map data corresponding to the render target coordinates is not 1 (S86: No), the processing proceeds to Step S88.

At Step S87, the render target coordinates are coordinates in which a text is actually rendered and not an edge with the text, and thus edge extraction unit 234 requests the expansion of expansion unit 135. Expansion unit 135 that receives such a request updates the pixel value of the render target pixel to the value of the foreground color gradation value that is updated by intermediate code analysis unit 233. The processing then proceeds to Step S90.

Meanwhile, at Step S88, edge extraction unit 234 confirms whether or not 1 is included in the values of the bit map data corresponding to the surrounding (herein, up, down, left, and right) coordinates of the render target coordinates. If 1 is included in the values of the bit map data corresponding to the surrounding coordinates of the render target coordinates (S88: Yes), the processing proceeds to Step S89. If 1 is not included in the values of the bit map data corresponding to the surrounding coordinates of the render target coordinates (S88: No), the processing proceeds to Step S90.

At Step S89, edge extraction unit 234 determines that the render target coordinates are an edge with the text, and requests the expansion of edge expansion unit 236. Processing of edge expansion unit 236 when the expansion is requested is described in detail with reference to FIG. 8. The processing then proceeds to Step S90.

At Step S90, edge extraction unit 234 adds 1 to the value xc in the x-coordinate of the render target pixel. The processing then returns to Step S85.

If value xc is more than value xrT+1 at Step S85 (S85: No), value xc in the x-coordinate of the render target pixel is more than value xrT+1 in the right-edge x-coordinate of the edge confirmation region, and thus edge extraction unit 234 can determine that all the edges corresponding to value yc are completed to be detected. Accordingly, edge extraction unit 234 advances the processing to Step S91, and updates value xc in the x-coordinate of the render target pixel to value xlT−1 in the left-edge x-coordinate of the edge confirmation region (S91). Moreover, edge extraction unit 234 adds 1 to value yc in the y-coordinate of the render target pixel (S92). The processing then returns to Step S84.

Figure 8:
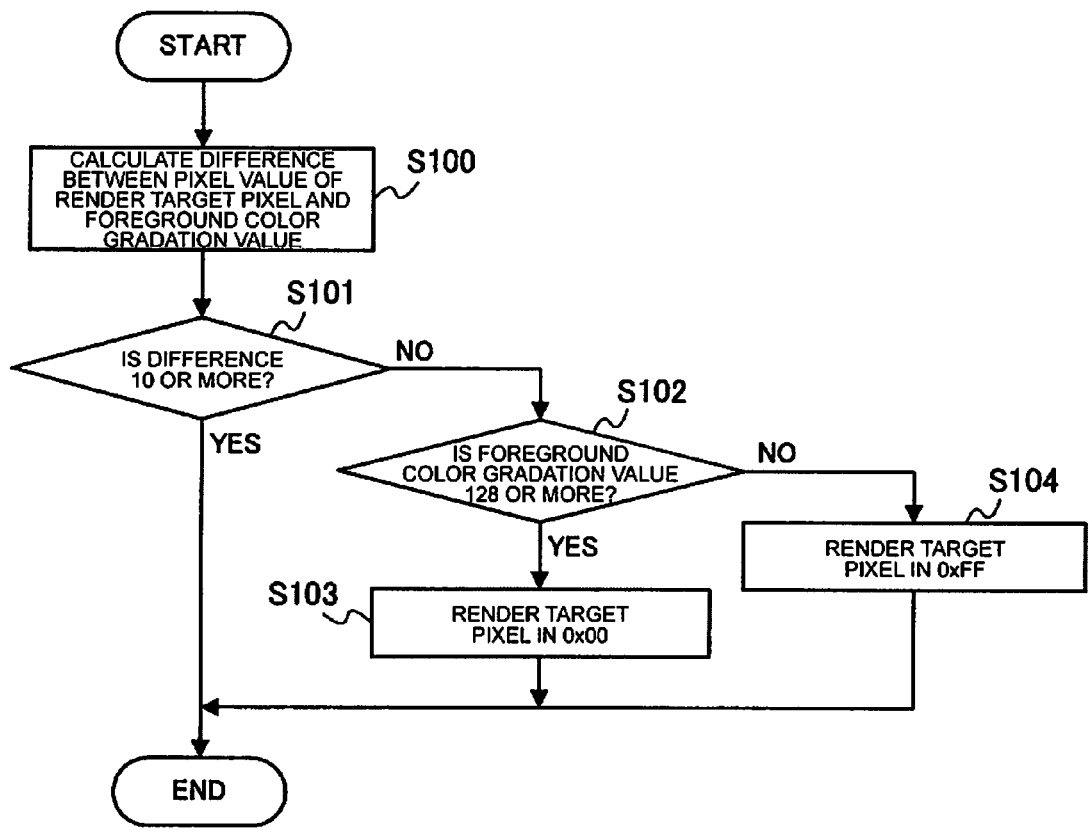
FIG. 8 is a flowchart illustrating expansion processing by the edge expansion unit in the second embodiment.

FIG. 8 is a flowchart illustrating the expansion processing by edge expansion unit 236 when the intermediate code is code for rendering a text. Firstly, edge expansion unit 236 calculates the difference between a pixel value of a render target pixel that is already stored in raster buffer 137 and a foreground color gradation value updated by intermediate code analysis unit 233 (S100). Edge expansion unit 236 then determines whether or not the difference calculated at Step S100 is equal to or more than a preset first value (for example, 10) (S101). If the difference is equal to or more than the preset first value (S101: Yes), edge expansion unit 236 determines that the color of an adjacent image region is not approximate to the color of the text to be rendered, and completes the flow. On the other hand, if the difference is less than the preset first value (S101: No), edge expansion unit 236 determines that the color of the adjacent image region is approximate to the color of the text to be rendered, and the processing proceeds to Step S102.

At Step S102, a boundary is necessary to be highlighted because the color of the text to be rendered at this time and the color of the adjacent image region are approximate to each other. Accordingly, edge expansion unit 236 determines whether or not the foreground color gradation value updated by intermediate code analysis unit 233 is equal to or more than a preset second value (for example, 128). If the foreground color gradation value is equal to or more than the preset second value (S102: Yes), the processing proceeds to Step S103. On the other hand, if the foreground color gradation value is less than the preset second value (S102: No), the processing proceeds to Step S104.

At Step S103, edge expansion unit 236 determines that the color of the text to be rendered at this time is a dark color, and sets the pixel value of the render target pixel that is already stored in raster buffer 137 to a lighter color than the color of the text to be rendered at this time, for example, 0. On the other hand, at Step S104, edge expansion unit 236 determines that the color of the text to be rendered at this time is a light color, and sets the pixel value of the render target pixel that is already stored in raster buffer 137 as a darker color than the color of the text to be rendered at this time, for example, 255.

Figure 9:
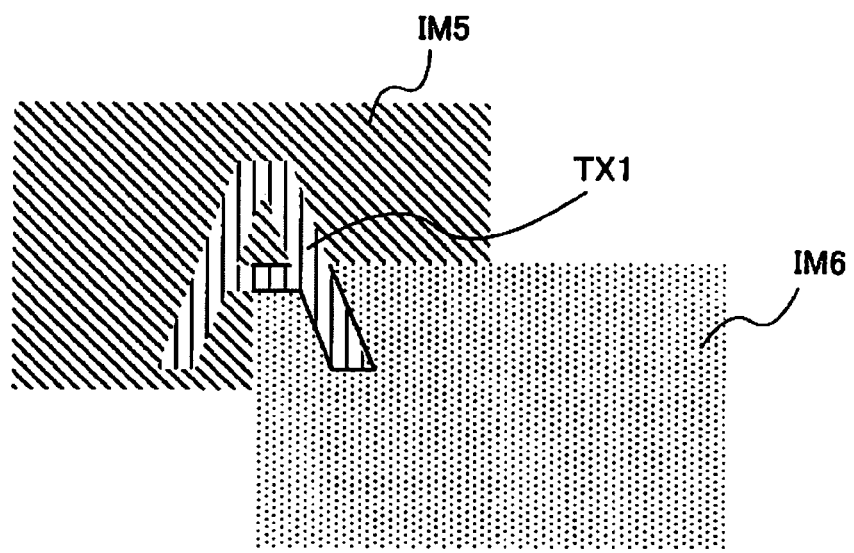
FIG. 9 is a schematic view illustrating an example of image data generated in the second embodiment.

FIG. 9 illustrates a result printed on the basis of print data that includes a command to render a text (herein, character "A") through the processing described in the foregoing. Herein, for example, assume that edit unit 131 stores, on the basis of the print data transmitted from higher-level apparatus 170, and in reception buffer 120: foreground color intermediate code to designate (K)=(0xB3), rectangle intermediate code, foreground color intermediate code to designate (K)= (0x30), rectangle intermediate code, foreground color intermediate code to designate (K)=(0x35), and a text intermediate code including information of bit map data representing "A", (x, y)=(400, 450) as upper-left coordinates, and (x, y)= (529, 569) as lower-right coordinates. In such a case, intermediate code analysis unit 233 performs a processing of the foreground color intermediate code to designate (K)=(0xB3), the rectangle intermediate code, the foreground color intermediate code to designate (K)=(0x30), the rectangle intermediate code, and the foreground color intermediate code to designate (K)=(0x35) similar to those in the first embodiment. Thereafter, intermediate code analysis unit 233 notifies edge extraction unit 234 of the intermediate code expansion, on the basis of the text intermediate code, with information on a render area corresponding to the text intermediate code. In such a case, for example, as illustrated in FIG. 9, an edge is not highlighted because a pixel value (foreground color gradation value) of character TX1 of "A" and a pixel value (foreground color gradation value) of rectangular image region IM5 are not approximate to each other. On the other hand, a part of an edge of rectangular image region IM6 is highlighted because the pixel value (foreground color gradation value) of character TX1 of "A" and a pixel value (foreground color gradation value) of rectangular image region IM6 are approximate to each other. Herein, a pixel value in the part of the edge is set to 255 (black color) because character TX1 of "A" is rendered in a relatively light color.

As in the foregoing, with the second embodiment, not only in a case such as a graphic where rendering is expressed by coordinates, but also in a case such as a text where a render area is expressed with coordinates information and bit map data, if fill foreground colors are similar, a boundary therebetween can be highlighted.

As in the foregoing, with the first and second embodiments, in gray-scale, even when pixel values are approximate to, or are the same as, each other in adjacent regions, an edge between the adjacent image regions is highlighted. This can obtain an easily-recognizable boundary between the image regions, and an output similar to the output result obtained by merely performing original gray conversion.

In the first and second embodiments described in the foregoing, although when highlighting an edge, as illustrated at Step S84 in FIG. 5 or Step S102 in FIG. 8, edge expansion unit 136 or 236 changes a pixel value of a render target pixel with reference to merely a foreground color gradation value, the invention is not limited to such an example. For example, edge expansion units 136, 236 may change the pixel value of the render target pixel with reference to a pixel value already stored as the pixel value of the render target pixel, instead of the foreground color gradation value. For example, if a pixel value initially set for the render target pixel is equal to or more than a second value, the processing may progress to Step S75 or Step S103, whereas if the pixel value is less than the second value, the processing proceeds to Step S76 or Step S104. Moreover, edge expansion units 136, 236 may change the pixel value of the render target pixel with reference to the foreground color gradation value and the pixel value initially set for the render target pixel. For example, if at least either one of these values is equal to or more than the second value, the processing may progress to Step S75 or Step S103, whereas if all these values are less than the second value, the processing may progress to Step S76 or Step S104. Moreover, if an addition value of the foreground color gradation value and the pixel value initially set for the render target pixel is equal to or more than a preset third value, the processing may progress to Step S75 or Step S103, whereas if the addition value of these values is less than the third value, the processing may progress to Step S76 or Step S104. Herein, the third value is, for example, 256.

Although the case where color print data is converted into gray-scale image data is explained as examples in the first and second embodiments, the invention is not limited to such an example. For example, even when color image data is generated from color print data, an edge of the image regions adjacent to each other and having approximate colors can be highlighted. For example, intermediate code analysis units 133, 233 update values of a Y component, an M component, a C component, and a K component specified with the print data to foreground color gradation values at Step S17 in FIG. 2. Moreover, at Step S70 in FIG. 5, out of the values already set as pixel values for a render target pixel, if all the values of Y component, the M component, the C component, and the K component are 0, edge expansion unit 136 advances the processing to Step S73, whereas if at least any one of the values of the Y component, the M component, the C component, and the K component is not 0, edge expansion unit 136 advances the processing to Step S71. At Step S71 in FIG. 5 or at Step S100 in FIG. 8, edge expansion unit 136 or 236 calculates the difference between the pixel value initially set for the render target pixel and the foreground color gradation value using values to which a value in 256 gradations of each color of CMYK is added. At Step S72 or S101, if the difference calculated at Step S71 or S100 is equal to or more than 40, edge expansion unit 136 or 236 determines that the colors are not approximate to each other, and advances the processing to Step S73 or completes the flow. On the other hand, if the difference is less than 40, edge expansion unit 136 or 236 determines that the colors are approximate to each other, and advances the processing to Step S74 or S102. Note that, the invention is not limited to such an example. Whether or not the colors are approximate to each other may be determined in such a manner that a color difference between the pixel value initially set for the render target pixel and the foreground color gradation value is calculated, and the calculated color difference is compared with a preset fourth value, for example. At Step S74 in FIG. 5 or Step S102 in FIG. 8, edge expansion unit 136 or 236 converts the values of the colors of the component C, the component M, the component Y, and the component K into an RGB value. If the converted one component, for example the B component, is equal to or more than a preset value (for example, 128), edge expansion unit 136 or 236 then updates the pixel value of the render target pixel to CMYK=(0, 0, 0, 0) at Step S75 or S103. However, if the B component is less than the preset value, edge expansion unit 136 or 236 then updates the pixel value of the render target pixel to CMYK=(0xFF, 0xFF, 0xFF, 0xFF) at Step S76 or S104. Note that, although the converted one component, for example, the B component is compared with the preset value herein, edge expansion unit 136 or 236 may determine whether or not at least one component among the converted multiple components is equal to or is more than the preset value. Moreover, edge expansion unit 136 or 236 may compare an added value of the converted multiple components with the preset value.

Although the case where a graphic is rendered is explained in the first and second embodiments, the invention is not limited to such an example. For example, even when an image is rendered on the basis of image data, a boundary between image regions can be highlighted if necessary in such a manner that a region indicated by the image data in which rendering is performed is regarded as a rectangular region, and the processing similar to that of a rectangle is performed.

Although the example in which the invention is applied to the printing apparatus is explained in the first and second embodiments described in the foregoing, the invention can be applied to image formation apparatuses such as a multifunction peripheral, a copier, and a facsimile device. Moreover, the invention can be applied to a printer driver having such a form that an expanded image is transmitted as print data, if the process similar to that in the embodiments described in the foregoing is used through the process for generating the transmission image.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:
    a data generation unit configured to generate image data based on image formation data giving an instruction to print an image including image regions, the image data indicating a corresponding image region pixel value associated with the pixels of each of the image regions; and
    an image formation unit configured to form the image on a recording medium based on the image data generated by the data generation unit, wherein
    the data generation unit generates the image data such that a boundary between one of the image regions and an image region adjacent to the one image region is highlighted, if the corresponding image region pixel value of the one image region and the corresponding image region pixel value of the adjacent image region are approximately equal to each other.

2. The image formation apparatus according to claim 1, wherein the data generation unit includes:
    an edge extraction unit configured to extract each pixel that is to form an edge of the one image region; and
    an edge expansion unit configured to, when a difference between a pixel value initially set for the pixel extracted by the edge extraction unit and the image region pixel value set to form the one image region based on the image formation data is less than a preset first value, update the pixel value of the pixel extracted by the edge extraction unit to a pixel value for highlighting the boundary.

3. The image formation apparatus according to claim 2, wherein the edge expansion unit changes the pixel value for highlighting the boundary in accordance with at least any one of the pixel value initially set for the pixel extracted by the edge extraction unit and the image region pixel value set to form the one image region based on the image formation data.

4. The image formation apparatus according to claim 3, wherein the pixel value for highlighting the boundary is a value different from the pixel value initially set for the pixel extracted by the edge extraction unit and the image region pixel value set to form the one image region based on the image formation data.

5. The image formation apparatus according to claim 3, wherein
    if a color indicated by at least any one of the pixel value initially set for the pixel extracted by the edge extraction unit and the image region pixel value set to form the one image region based on the image formation data is equal to or darker than a color indicated by a preset second value, the edge expansion unit updates the pixel value of the pixel extracted by the edge extraction unit to a pixel value indicating a lighter color than the color indicated by the image region pixel value set to form the one image region based on the image formation data, and if the color indicated by at least any one of the pixel value initially set for the pixel extracted by the edge extraction unit and the image region pixel value set to form the one image region based on the image formation data is lighter than the color indicated by the preset second value, the edge expansion unit updates the pixel value of the pixel extracted by the edge extraction unit to a pixel value indicating a darker color than the color indicated by the image region pixel value set to form the one image region based on the image formation data.

6. The image formation apparatus according to claim 1, wherein the data generation unit includes:
an edge extraction unit configured to extract each pixel that is to form an edge of the one image region; and
an edge expansion unit configured to, when a difference between the image region pixel value of the pixels of the adjacent image region adjacent to the pixel extracted by the edge extraction unit and the image region pixel value set to form the one image region based on the image formation data is less than a preset first value, update the pixel value of the pixel extracted by the edge extraction unit to a pixel value for highlighting the boundary.

7. The image formation apparatus according to claim 6, wherein the edge expansion unit changes the pixel value for highlighting the boundary in accordance with at least any one of the image region pixel value of the pixels of the adjacent image region adjacent to the pixel extracted by the edge extraction unit and the image region pixel value set to form the one image region based on the image formation data.

8. The image formation apparatus according to claim 7, wherein the pixel value for highlighting the boundary is a value different from the image region pixel value of the pixels of the adjacent image region adjacent to the pixel extracted by the edge extraction unit and the wherein the pixel value for highlighting the boundary is a value different from the image region pixel value set to form the one image region based on the image formation data.

9. The image formation apparatus according to claim 7, wherein
if a color indicated by at least any one of the pixel value of the pixels of the adjacent image region adjacent to the pixel extracted by the edge extraction unit and the image region pixel value set to form the one image region based on the image formation data is equal to or darker than a color indicated by a preset second value, the edge expansion unit updates the pixel value of the pixel extracted by the edge extraction unit to a pixel value indicating a lighter color than the color indicated by the image region pixel value set to form the one image region based on the image formation data, and if the color indicated by at least any one of the pixel value of the pixels of the adjacent image region adjacent to the pixel extracted by the edge extraction unit and the image region pixel value set to form the one image region based on the image formation data is lighter than the color indicated by the preset second value, the edge expansion unit updates the pixel value of the pixel extracted by the edge extraction unit to a pixel value indicating a darker color than the color indicated by the image region pixel value set to form the one image region based on the image formation data.

10. The image formation apparatus according to claim 1, wherein the data generation unit includes:
an edge extraction unit configured to extract each pixel in the adjacent image region, the pixel being to form an edge in contact with the one image region;
an edge expansion unit configured to, when a difference between the pixel value initially set for the pixel extracted by the edge extraction unit and the image region pixel value set to form the one image region based on the image formation data is less than a preset first value, update the pixel value of the pixel extracted by the edge extraction unit to a pixel value for highlighting the boundary.

11. The image formation apparatus according to claim 10, wherein the edge expansion unit changes the pixel value for highlighting the boundary in accordance with at least any one of the pixel value initially set for the pixel extracted by the edge extraction unit and the image region pixel value set to form the one image region based on the image formation data.

12. The image formation apparatus according to claim 11, wherein the pixel value for highlighting the boundary is a value different from the pixel value initially set for the pixel extracted by the edge extraction unit and the image region pixel value set to form the one image region based on the image formation data.

13. The image formation apparatus according to claim 11, wherein
if a color indicated by at least any one of the pixel value initially set for the pixel extracted by the edge extraction unit and the image region pixel value set to form the one image region based on the image formation data is equal to or darker than a color indicated by a preset second value, the edge expansion unit updates the pixel value of the pixel extracted by the edge extraction unit to a pixel value indicating a lighter color than the color indicated by the image region pixel value set to form the one image region based on the image formation data, and if the color indicated by at least any one of the pixel value initially set for the pixel extracted by the edge extraction unit and the image region pixel value set to form the one image region based on the image formation data is lighter than the color indicated by the preset second value, the edge expansion unit updates the pixel value of the pixel extracted by the edge extraction unit to a pixel value indicating a darker color than the color indicated by the image region pixel value set to form the one image region based on the image formation data.

14. The image formation apparatus according to claim 5, wherein the edge expansion unit sets a white color as the lighter color and a black color as the darker color.

15. The image formation apparatus according to claim 9, wherein the edge expansion unit sets a white color as the lighter color and a black color as the darker color.

16. The image formation apparatus according to claim 2, wherein the data generation unit further includes:
an edit unit configured to generate intermediate code for rendering the image regions based on the image formation data;
an intermediate code storage unit configured to store the intermediate code generated by the edit unit; and
an intermediate code analysis unit configured to analyze the intermediate code stored in the intermediate code storage unit, and specify render areas and pixel values of the image regions, wherein the edge extraction unit extracts each pixel that is to form the edge of the one image region based on the render areas specified by the intermediate code analysis unit, and the edge expansion unit sets the pixel value set to form the one image region based on the image formation data to a corresponding one of the pixel values specified by the intermediate code analysis unit.

17. The image formation apparatus according to claim 6, wherein the data generation unit further includes:

an edit unit configured to generate intermediate code for rendering the image regions based on the image formation data;

an intermediate code storage unit configured to store the intermediate code generated by the edit unit; and an intermediate code analysis unit configured to analyze the intermediate code stored in the intermediate code storage unit, and specify render areas and pixel values of the image regions, wherein the edge extraction unit extracts each pixel that is to form the edge of the one image region based on the render areas specified by the intermediate code analysis unit, and the edge expansion unit sets the pixel value set to form the one image region based on the image formation data to a corresponding one of the pixel values specified by the intermediate code analysis unit.

18. The image formation apparatus according to claim 10, wherein the data generation unit further includes:

an edit unit configured to generate intermediate code for rendering the image regions based on the image formation data;

an intermediate code storage unit configured to store the intermediate code generated by the edit unit; and an intermediate code analysis unit configured to analyze the intermediate code stored in the intermediate code storage unit, and specify render areas and pixel values of the image regions, wherein the edge extraction unit extracts each pixel in the adjacent image region, the pixel being to form an edge in contact with the one image region based on the render areas specified by the intermediate code analysis unit, and the edge expansion unit sets the pixel value set to form the one image region based on the image formation data to a corresponding one of the pixel values specified by the intermediate code analysis unit.

19. The image formation apparatus according to claim 16, wherein the image formation data is data giving an instruction to form the image regions in color, and the edit unit generates intermediate code for rendering the image regions in a gray-scale based on the image formation data.

20. A method of forming an image by an image formation apparatus, comprising:

generating, by a data generation unit of the image formation apparatus, image data based on image formation data giving an instruction to print an image including image regions, the image data indicating a corresponding image region pixel value associated with the pixels of each of the image regions; and forming, by an image formation unit of the image formation apparatus, an image on a recording medium based on the image data generated in the generating of the image data, wherein the generating step comprises generating, by the data generation unit, the image data such that a boundary between one of the image regions and an image region adjacent to the one image region is highlighted, if the corresponding image region pixel value of the one image region and the corresponding image region pixel value of the adjacent image region are approximately equal to each other.

21. The method according to claim 20, wherein the generating step comprises:

extracting each pixel that is to form an edge of the one image region; and updating, when a difference between a pixel value initially set for the pixel extracted by the extracting step and the image region pixel value set to form the one image region based on the image formation data is less than a preset first value, the pixel value of the pixel extracted by the extracting step to a pixel value for highlighting the boundary.

22. The method according to claim 20, wherein the generating step comprises:

extracting each pixel that is to form an edge of the one image region; and updating, when a difference between the image region pixel value of the pixels of the adjacent image region adjacent to the pixel extracted by the extracting step and the image region pixel value set to form the one image region based on the image formation data is less than a preset first value, the pixel value of the pixel extracted by the extracting step to a pixel value for highlighting the boundary.

23. The method according to claim 20, wherein the generating step comprises:

extracting each pixel in the adjacent image region, the pixel being to form an edge in contact with the one image region;

updating, when a difference between the pixel value initially set for the pixel extracted by the extracting step and the image region pixel value set to form the one image region based on the image formation data is less than a preset first value, the pixel value of the pixel extracted by the extracting step to a pixel value for highlighting the boundary.

* * * * *